United States Patent
Bang

(10) Patent No.: US 9,965,178 B2
(45) Date of Patent: May 8, 2018

(54) METHOD AND ELECTRONIC DEVICE THAT CONTROLS A TOUCH SCREEN BASED ON BOTH A COORDINATE OF A GESTURE PERFORMED THEREON AND A TILT CHANGE VALUE

(71) Applicant: Samsung Electronics Co., Ltd., Gyeonggi-do (KR)

(72) Inventor: Kwang-Min Bang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 109 days.

(21) Appl. No.: 15/096,414

(22) Filed: Apr. 12, 2016

(65) Prior Publication Data

US 2016/0306543 A1    Oct. 20, 2016

(30) Foreign Application Priority Data

Apr. 20, 2015    (KR) .................. 10-2015-0055319

(51) Int. Cl.
| | |
|---|---|
| G06F 3/041 | (2006.01) |
| G06F 3/0488 | (2013.01) |
| G06F 3/0346 | (2013.01) |
| G06F 3/0484 | (2013.01) |
| G06F 3/0482 | (2013.01) |

(52) U.S. Cl.
CPC ........ G06F 3/04883 (2013.01); G06F 3/0346 (2013.01); G06F 3/0482 (2013.01); G06F 3/0488 (2013.01); G06F 3/04847 (2013.01)

(58) Field of Classification Search
None
See application file for complete search history.

(56) References Cited

U.S. PATENT DOCUMENTS

| | | | |
|---|---|---|---|
| 2009/0077497 A1* | 3/2009 | Cho ................... | G06F 3/04817 715/814 |
| 2010/0058254 A1* | 3/2010 | Narita ................. | G06F 3/0481 715/863 |
| 2012/0306788 A1 | 12/2012 | Chen et al. | |
| 2015/0100910 A1 | 4/2015 | Luo et al. | |
| 2015/0339044 A1 | 11/2015 | Matsuda | |

FOREIGN PATENT DOCUMENTS

| | | |
|---|---|---|
| EP | 2 241 958 A1 | 10/2010 |
| EP | 2 672 367 A1 | 12/2013 |
| EP | 2 835 728 A1 | 2/2015 |
| JP | 2014-174764 A | 9/2014 |
| KR | 10-1250821 B1 | 4/2013 |
| WO | 2014/098207 A1 | 6/2014 |

OTHER PUBLICATIONS

European Search Report dated Aug. 17, 2016.
European Search Report dated Sep. 27, 2017.

* cited by examiner

Primary Examiner — Ilana Spar
Assistant Examiner — Kirk Hermann
(74) Attorney, Agent, or Firm — Cha & Reiter, LLC.

(57) ABSTRACT

A method in an electronic device comprising: displaying a screen on a touchscreen; identifying at least one coordinate of a gesture performed on the touchscreen; identifying a tilt change value of the electronic device; and controlling the screen based on the coordinate and the tilt change value of the electronic device and displaying the controlled screen.

20 Claims, 16 Drawing Sheets

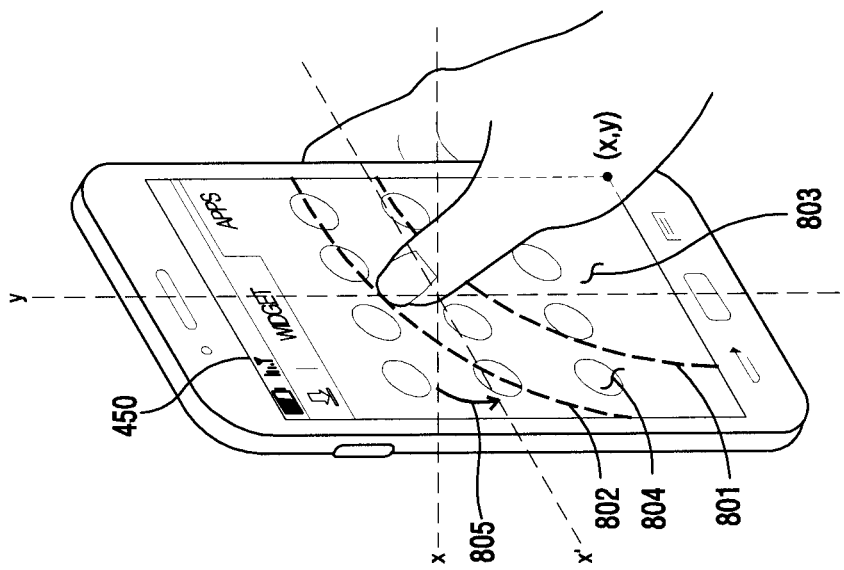
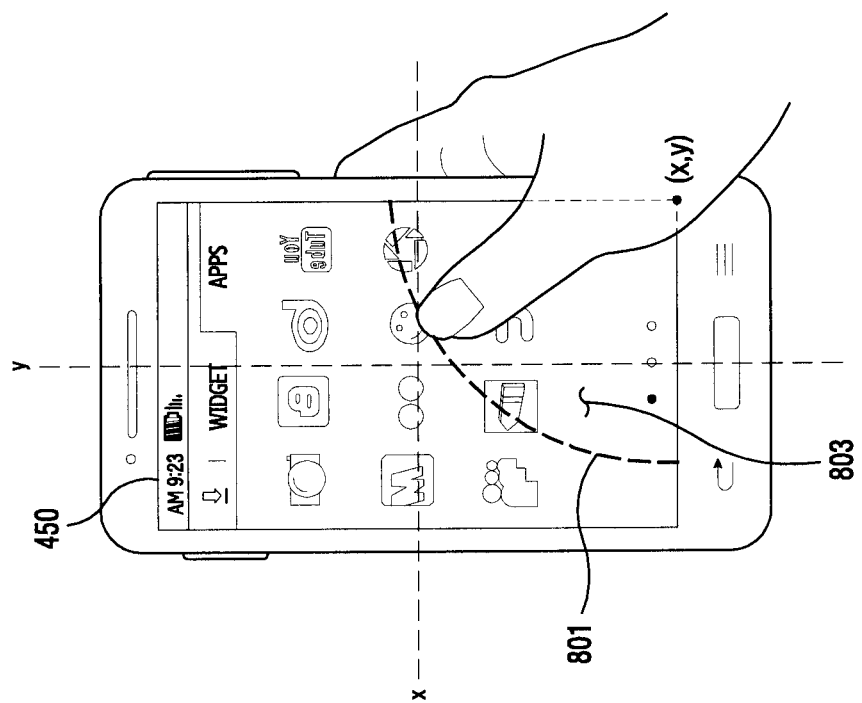
FIG.8A
FIG.8B

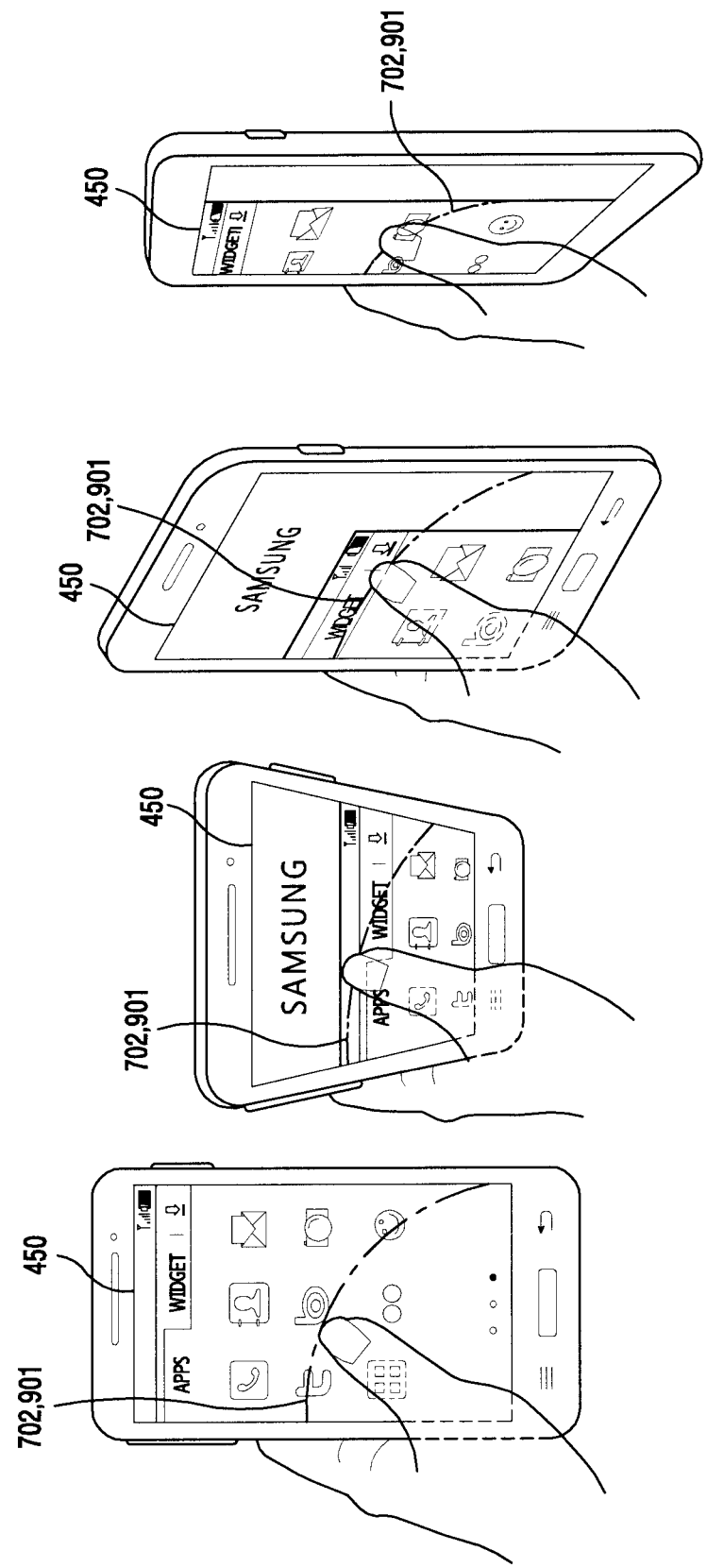

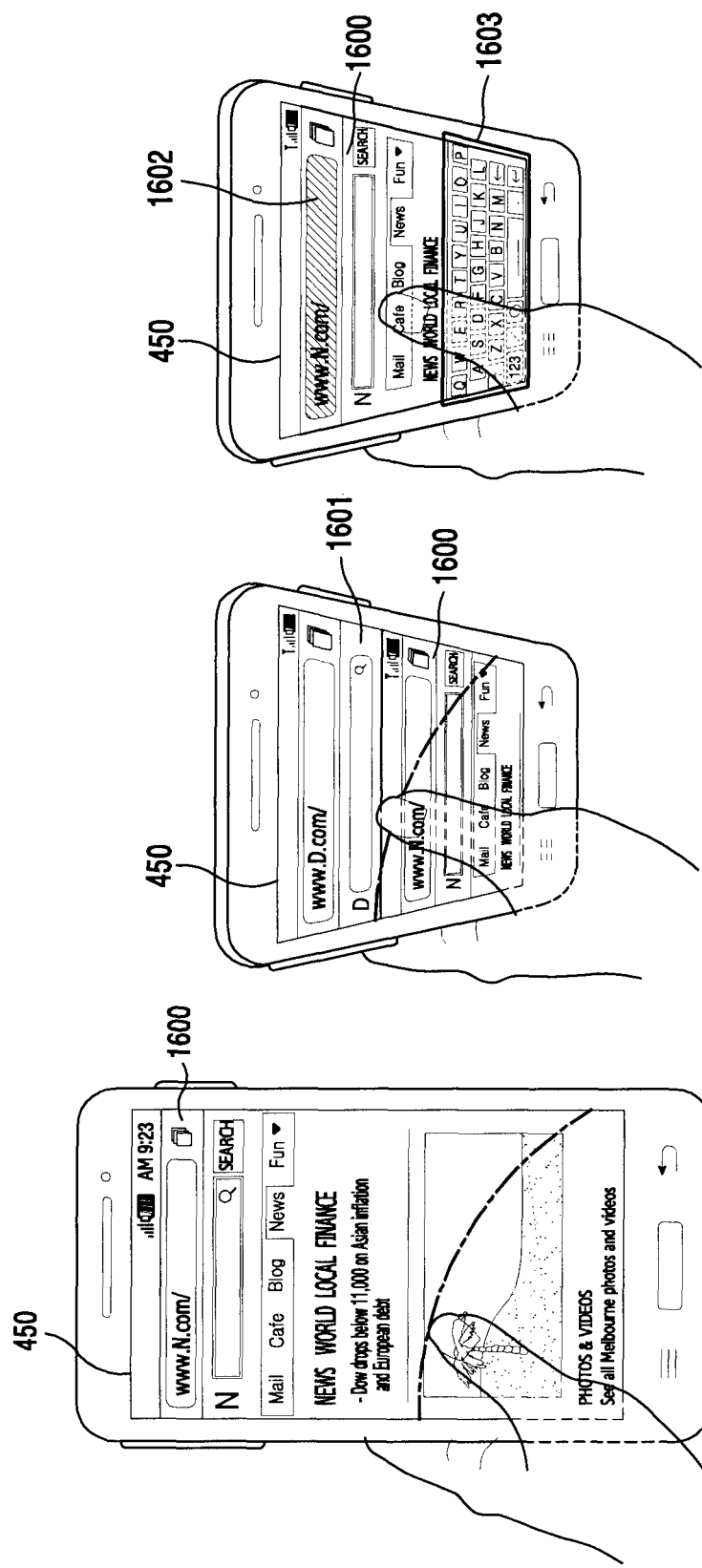

METHOD AND ELECTRONIC DEVICE THAT CONTROLS A TOUCH SCREEN BASED ON BOTH A COORDINATE OF A GESTURE PERFORMED THEREON AND A TILT CHANGE VALUE

CLAIM OF PRIORITY

This application claims priority under 35 U.S.C. §119(a) to Korean Application Serial No. 10-2015-0055319, which was filed in the Korean Intellectual Property Office on Apr. 20, 2015, the entire content of which is hereby incorporated by reference.

TECHNICAL FIELD

The present disclosure relates to electronic devices, in general, and more particularly to a method and electronic device for providing a user interface.

BACKGROUND

Electronic devices may have various functions and perform complex functions. For example, the electronic device may perform a mobile communication function, a data communication function, a data output function, or an image photographing function. The electronic device may include a display unit and an input unit. Recently, the display unit and the input unit are combined and generally implemented in the form of a touchscreen. The electronic device may output a screen corresponding to a signal input through the touchscreen into the touchscreen.

SUMMARY

According to aspects of the disclosure, a method is disclosed comprising: displaying a screen on a touchscreen; identifying at least one coordinate of a gesture performed on the touchscreen; identifying a tilt change value of the electronic device; and controlling the screen based on the coordinate and the tilt change value of the electronic device and displaying the controlled screen.

According to aspects of the disclosure, an electronic device is disclosed for providing a user interface, the electronic device comprising: a memory; a touchscreen; a sensor unit; and at least one processor operatively coupled to the memory, configured to: display a screen on the touchscreen; identify at least one coordinate of a gesture performed on the touchscreen; identify a tilt change value of the electronic device by using the sensor unit; and controlling the screen based on the coordinate and the tilt change value of the electronic device and displaying the controlled screen.

BRIEF DESCRIPTION OF THE DRAWINGS

The above and other aspects, features, and advantages of the present disclosure will be more apparent from the following detailed description taken in conjunction with the accompanying drawings, in which:

FIG. 8A is a diagram illustrating the operation of the processes of FIGS. 5-6, according to an embodiment of the present disclosure;

FIG. 8B is a diagram illustrating the operation of the processes of FIGS. 5-6, according to an embodiment of the present disclosure;

FIG. 14A is a diagram illustrating an example of a user interface, according to an embodiment of the present disclosure;

FIG. 14B is a diagram illustrating an example of a user interface, according to an embodiment of the present disclosure;

FIG. 14C is a diagram illustrating an example of a user interface, according to an embodiment of the present disclosure;

FIG. 14D is a diagram illustrating an example of a user interface, according to an embodiment of the present disclosure;

FIG. 16A is a diagram illustrating an example of a user interface, according to an embodiment of the present disclosure;

FIG. 16B is a diagram illustrating an example of a user interface, according to an embodiment of the present disclosure;

FIG. 16C is a diagram illustrating an example of a user interface, according to an embodiment of the present disclosure.

DETAILED DESCRIPTION

Figure 1:
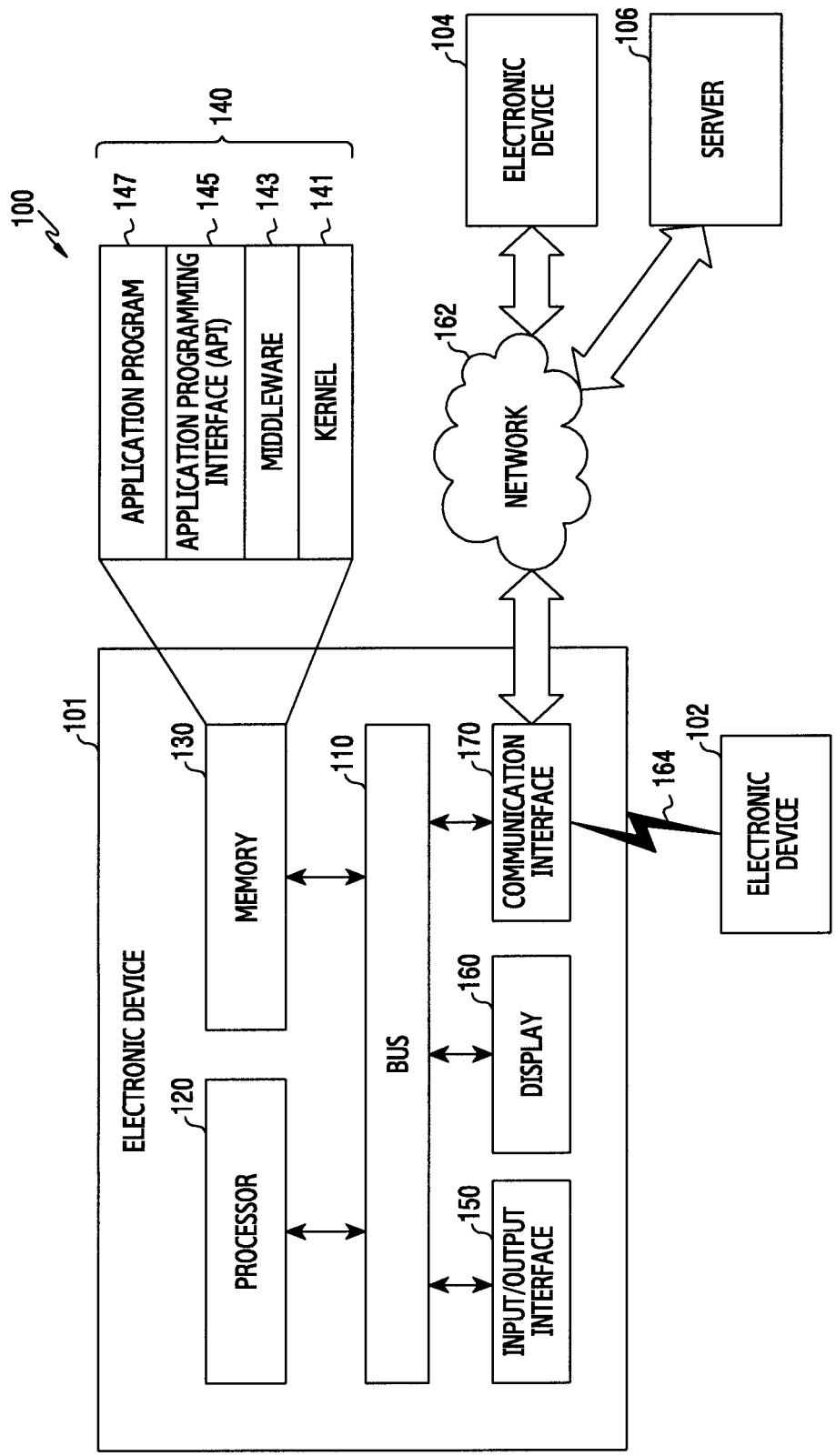
FIG. 1 is a diagram of an example of a network environment including an electronic device, according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of a network environment including an electronic device 101, according to an embodiment of the present disclosure. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided by the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touchscreen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
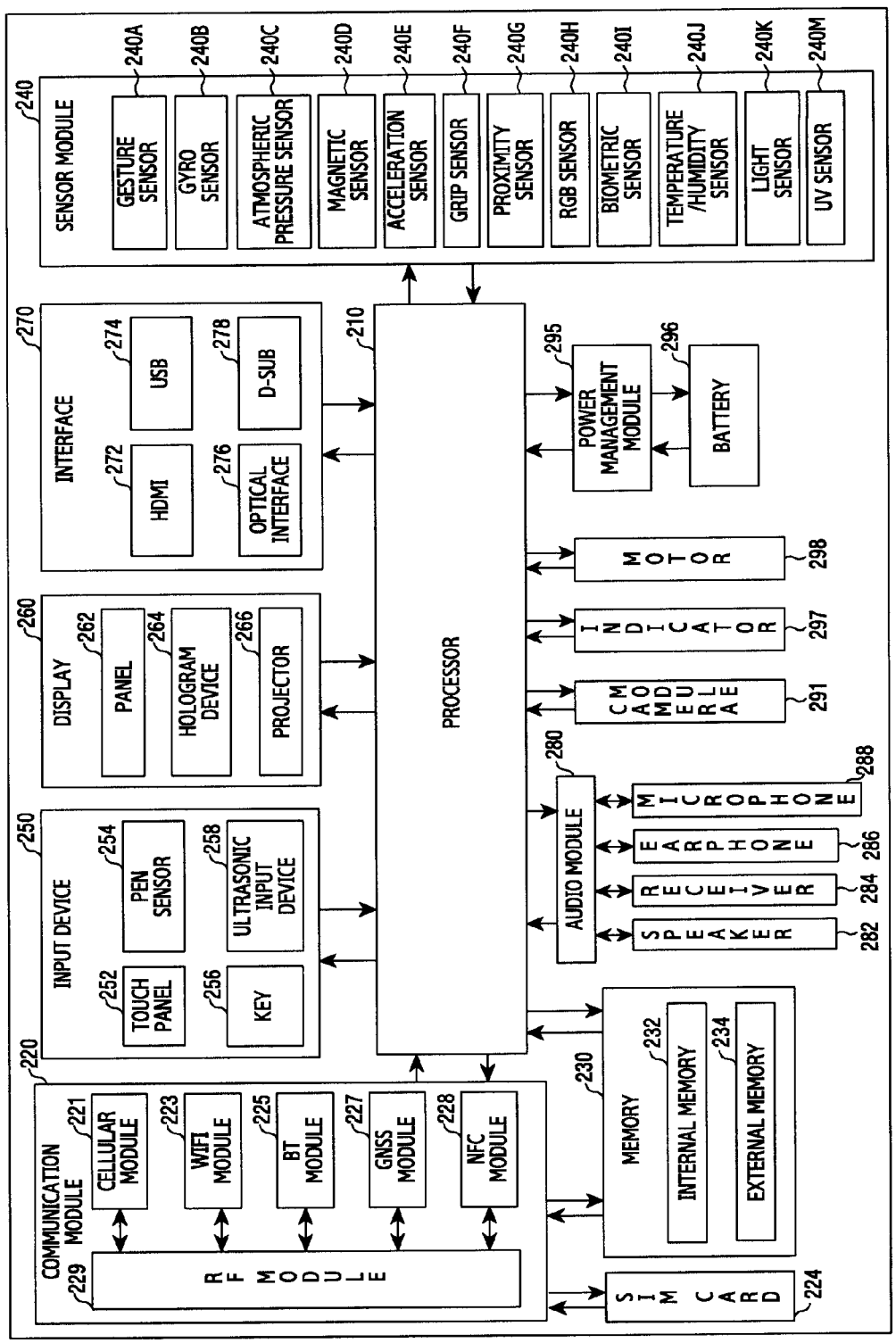
FIG. 2 is a diagram of an example of an electronic device, according to an embodiment of the present disclosure.

FIG. 2 is a diagram of an example of an electronic device 201, according to an embodiment of the present disclosure. For example, the electronic apparatus 201 may include the whole or part of the electronic apparatus 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three-dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, the power supply of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
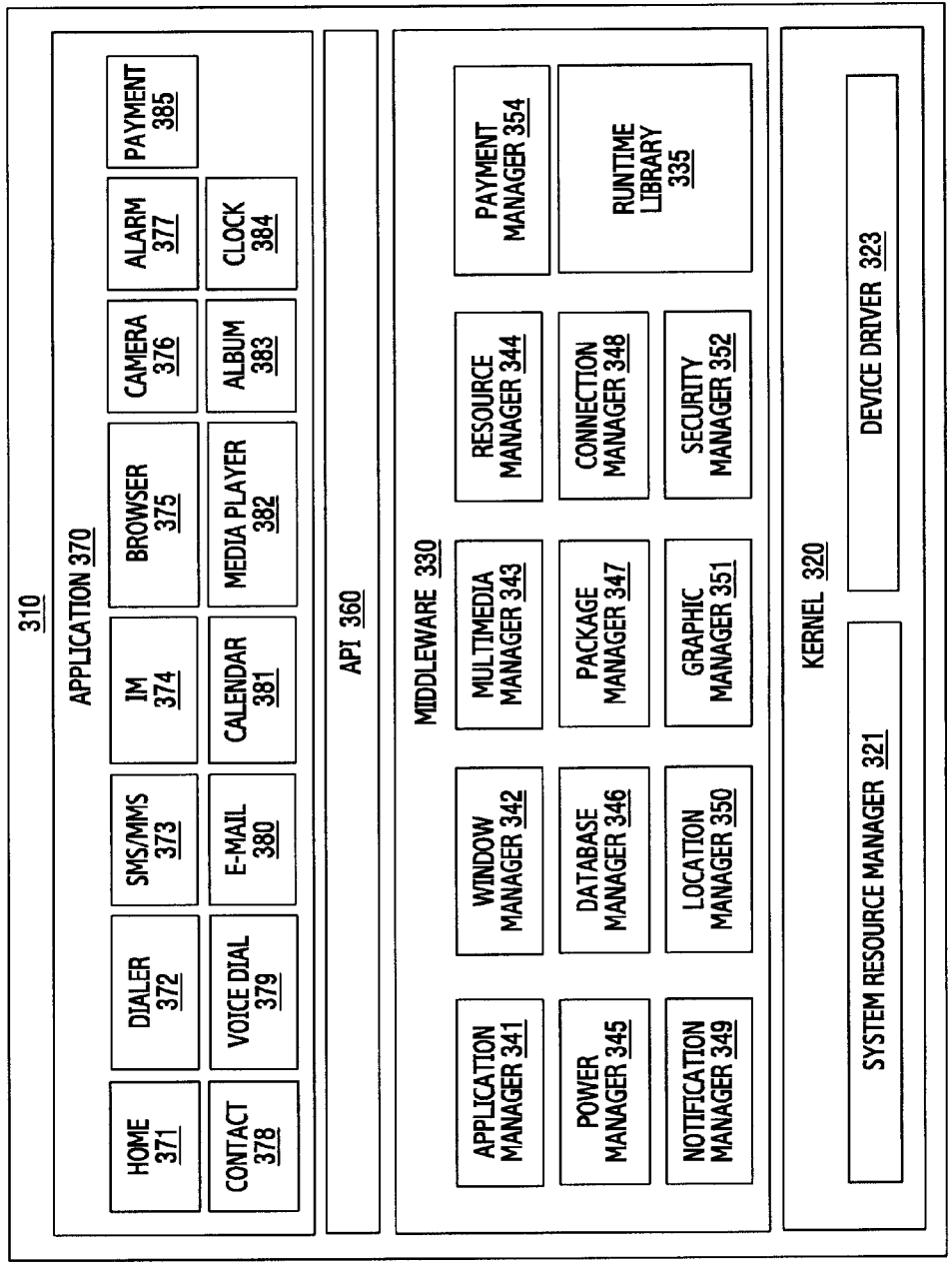
FIG. 3 is a diagram of an example of a program module, according to an embodiment of the present disclosure.

FIG. 3 is a diagram of an example of a program module, according to an embodiment of the present disclosure. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, healthcare (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a healthcare application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided by the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing various operations.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

Figure 4:
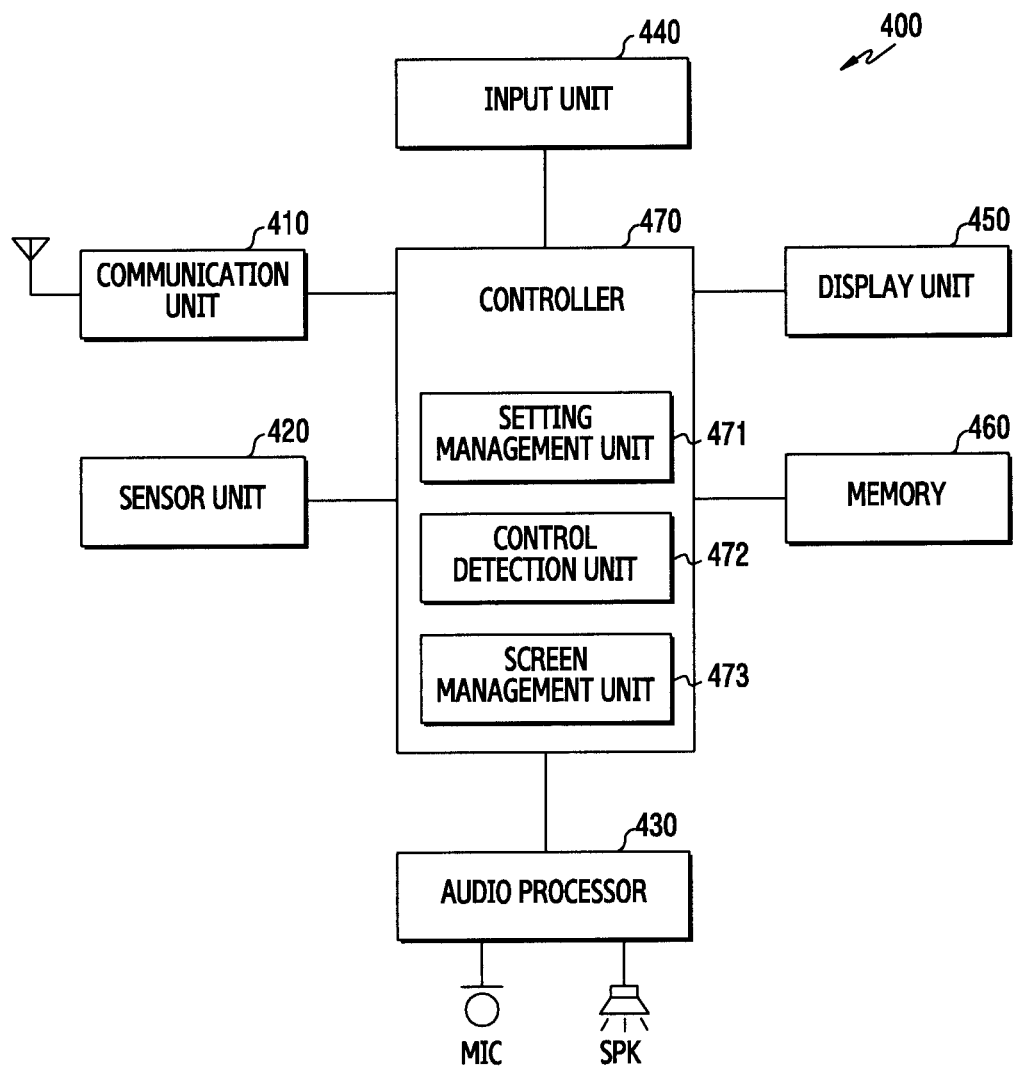
FIG. 4 is a diagram of an example of an electronic device, according to an embodiment of the present disclosure.

FIG. 4 is a diagram of an example of an electronic device 400, according to an embodiment of the present disclosure.

As illustrated, the electronic device 400 may include a communication unit 410, a sensor unit 420, an audio processor 430, an input unit 440, a display unit 450, a memory 460, and a controller 470.

The communication unit 410 may perform communication in the electronic device 400. For example, the communication unit 410 may communicate with an external device (not shown) through various communication schemes. The communication unit 410 may perform at least one of wireless communication and wired communication. To this end, the communication unit 410 may access at least one of a mobile communication network and a data communication network. For example, the external device may include an electronic device, a base station, a server, and a satellite. The communication schemes may include Long Term Evolution (LTE), Wideband Code Division Multiple Access (WCDMA), Global System for Mobile Communications (GSM), Wi-Fi, Bluetooth, and Near Field Communications (NFC).

The sensor unit 420 may sense a user's motion and transfer acquired sensing information to the controller 470. The sensor unit 420 may include at least one of a gesture sensor, a proximity sensor, a magnetic field sensor, a gyro sensor, an acceleration sensor, an angle sensor, and a grip sensor. Particularly, the sensor unit 420 may sense a tilt of the electronic device 400 made by the user's motion and transfer the sensed tilt to the controller 470.

The audio processor 430 may process an audio signal. For example, the audio processor 430 may include a speaker (SPK) and a microphone (MIC). The audio processor 430 may reproduce the audio signal output from the controller 470 through the speaker. The audio processor 430 may transfer the audio signal generated from the microphone to the controller 470.

The input unit 440 may generate input data in the electronic device 400. For example, the input unit 440 may generate input data in response to a user input of the electronic device 400. The input unit 440 may include at least one input means. The input unit 440 may include a keypad, a dome switch, a physical button, a touch panel, and a jog & shuttle. Particularly, the touch panel may sense a gesture on the touch panel, that is, coordinate information on hovering or touch performed by a user's finger and transfer the sensed information to the controller 470.

The display unit 450 may output a user interface. For example, the user interface may be a screen including image data and a web browser, or a screen including an object (for example, an icon). The display unit 450 may include a Liquid Crystal Display (LCD), a Light Emitting Diode (LED) display, an Organic LED (OLED) display, a Micro Electro Mechanical System (MEMS) display, and an electronic paper display. The display unit 450 may include a plurality of light emitting diodes. Further, the display unit 450 may be and the input unit 440 may be integrated together to form a touchscreen. The display unit 450 implemented as the touchscreen may transfer to the controller 470 coordinate information associated with a gesture performed on the surface of the display unit 450, such as a hovering input or a touch performed by a user's hand or finger.

The memory 460 may store operation programs of the electronic device 400. For example, the memory 460 may store a program for controlling the user interface according to a user input. The memory 460 may store information on a movable area.

The information on the movable area may be information identifying an area up to a location at which the user can touch the display unit 450 with one hand, and information indicating a tilt change value of the electronic device 400. The movable area may be set and stored as a first movable area and a second movable area or only as the first movable area according to various embodiments. For example, the second movable area may be an area which does not overlap with the first movable area. Since the movable area is changed by the size of the user's hand, the movable area may be set and stored by the user. Further, the movable area may be set and stored when the electronic device 400 is manufactured according to the size and resolution of the display unit 450.

According to various embodiments, when the user grips the electronic device 400 with the user's left hand, the first movable area may be set and stored as an area having a radius up to a location at which the user can touch the display unit 450 when the changed tilt of the electronic device 400 from a lower left corner of the display unit 450 is smaller than a threshold. The second movable area may be set and stored as an area having a radius up to a location at which the user can touch the display unit 450 while tilting the electronic device 400 in at least one of up and down directions, left and right directions, and a diagonal direction from a lower left corner of the display unit 450. According to an embodiment, the second movable area may be set and stored as an area having a radius up to a location at which the user can touch the display unit 450 when the changed tilt of the electronic device 400 from the lower left corner of the display unit 450 is smaller than a threshold different from the threshold used for the first movable area. An angle at which the electronic device 400 having the first movable area tilts to set the second movable area may be referred to as a tilt change value.

According to various embodiments, when the user grips the electronic device 400 with the user's left hand, the first movable area may be set and stored as an area having a radius up to a location at which the user can touch the display unit 450 while tilting the electronic device 400 in at least one of up and down directions, left and right directions, and a diagonal direction from the lower left corner of the display unit 450. For example, an angle at which the electronic device 400 tilts to set the first movable area may be a tilt change value of the electronic device 400.

Further, the memory 460 may store angle information including an indication of at least one of a first angle and a second angle. For example, the first angle may be an angle between a lower edge of the display unit 450 and a virtual line connecting a lower left corner or lower right corner of the display unit 450 and a predetermined point of an upper edge of the display unit 450. The second angle may be an angle between the lower edge of the display unit 450 and a virtual line connecting a lower left corner or lower right corner of the display unit 450 and a predetermined point of a right side edge or left side edge of the display unit 450. The first angle may be an angle smaller than 90 degrees and larger than the second angle. For example, the angle information may be set and stored according to a size and resolution of the display unit 450 when the electronic device 400 is manufactured.

The controller 470 may control the overall operation of the electronic device 400. The controller 470 may identify a movement coordinate of a gesture that is performed on the display unit 450. The controller 470 may identify a change value of the tilt of the electronic device 400. The controller 470 may control the screen displayed on the display unit 450 based on the movement coordinate and the tilt change value and display the controlled screen on the display unit 450. In this regard, the controller 470 may include a setting management unit 471, a control detection unit 472, and a screen management unit 473.

The setting management unit 471 may set a movable area based on sensing information and store the set movable area in the memory 460. Specifically, the setting management unit 471 may identify a coordinate of a gesture detected on the display unit 450. For example, the gesture may include at least one of a hovering and touch that is performed on the display unit 450. The setting management unit 471 may set a first movable area and a second movable area based on the tilt change value of the electronic device 400 when the gesture is performed. For example, the coordinate may be a coordinate of a trace of a thumb moving on the surface of the display unit 450 when the user grips the electronic device 400 with one hand.

According to various embodiments, when the changed tilt of the electronic device 400 is smaller than a threshold, for example, when the changed tilt is close to 0 degrees, the setting management unit 471 may set the first movable area based on the coordinate and store the set first movable area in the memory 460. For example, in instances in which the user grips the electronic device 400 with the user's left hand, when the changed tilt from the lower left corner of the display unit 450 is smaller than the threshold, an area having a radius up to a location at which the user's thumb can touch the display unit 450 may be set as the first movable area.

When the changed tilt of the electronic device 400 is larger than the threshold, for example, when the changed tilt is larger than 10 degrees, the setting management unit 471 may set the second movable area based on the coordinate and store an indication of the set second movable area in the memory 460. For example, the second movable area may be set based on an assumption that the user grips the electronic device 400 with the user's left hand. The second movable area may be an area having a radius up to a location at which the user can touch the display unit 450 while tilting the electronic device 400 in one direction from the lower left corner of the display unit 450. For example, the one direction may be at least one of up and down directions, left and right directions, and a diagonal direction. The second movable area may be set as an area except for an area overlapping the first movable area. For example, the setting management unit 471 may identify, as a tilt change value of the electronic device 400, an angle at which the electronic device 400 having set the first movable area tilts to set the second movable area.

According to various embodiments, the setting management unit 471 may set, as the first movable area, an area having a radius up to a location at which the user can touch the display unit 450 while tilting the electronic device 400 in one direction from the lower left corner of the display unit 450. For example, the one direction may be at least one of up and down directions, left and right directions, and a diagonal direction. The setting management unit 471 may store an indication of the first movable area in the memory 460. For example, when the changed tilt of the electronic device 400 is smaller than the threshold, for example, when the changed tilt is close to 0 degrees, the setting management unit 471 the angle, at which the electronic device 400 tilts to set the first movable area, as the tilt change value of the electronic device 400.

When a signal for activating the display unit 450 is received from the input unit 440, the control detection unit 472 may detect whether the hand which controls the electronic device 400 is a left hand or a right hand. The control detection unit 472 may identify a coordinate of a gesture detected on the surface of the display unit 450. The control detection unit 472 may identify a movement direction and a movement angle of the thumb from the identified coordinate. The control detection unit 472 may identify the movement direction and the movement angle of the thumb based on coordinates of a start location and an end location of the gesture performed on the display unit 450. The control detection unit 472 may identify a tilt change value of the electronic device 400 from sensing information transferred from the sensor unit 420.

The control detection unit 472 may detect whether the hand which controls the electronic device 400 is the left hand or the right hand based on the movement direction and the movement angle of the finger, and the tilt change value of the electronic device 400. For example, the control detection unit 472 may detect that the movement direction of the thumb corresponds to a direction from the left to the right of the display unit 450, the movement angle of the finger is smaller than a particular angle stored in the memory 460, and the user's left hand controls the electronic device 400 when the tilt of the electronic device 400 changes in a clockwise direction.

According to an embodiment, the control detection unit 472 may identify which finger controls the electronic device 400 based on the sensor information acquired by a sensor located at a bezel of the electronic device 400.

The control detection unit 472 may continuously identify a movement coordinate of the gesture detected on the surface of the display unit 450, for example, a movement coordinate according to the gesture of the thumb. When the coordinate of the end location is not included in neither the first movable area nor the second movable area when the first movable area and the second movable area are set by the setting management unit 471, the control detection unit 472 may retrieve from the memory 460 indication(s) of the first angle and the second angle. Further, when the coordinate of the end location is not located in the first movable area, the control detection unit 472 may load the indication(s) of the first angle and the second angle stored in the memory 460.

The control detection unit 472 may identify a third angle based on the gesture of the thumb. The control detection unit 472 may extract, as a particular point, a point at the center of an area on which a hovering is made by the user's palm when the user grips the electronic device 400. The control detection unit 472 may identify the extracted particular point as a start point. The control detection unit 472 may identify a location where the movement of the user's thumb ends. The control detection unit 472 may identify, as the third angle, an angle between a virtual line running in parallel to the lower edge from the start point and a virtual line connecting the start point and the end location.

The screen management unit 473 may control the screen displayed on the display unit 450 based on a result of the comparison between the first angle, the second angle, and the third angle identified by the control detection unit 472 and display the controlled screen.

According to an embodiment, when the third angle is larger than the first angle, the screen management unit 473 may move the screen displayed on the display unit 450 or at least one object included in the screen in up and down directions.

According to an embodiment, when the third angle is smaller than the second angle, the screen management unit 473 may move the screen displayed on the display unit 450 or at least one object included in the screen in left and right directions.

According to an embodiment, when the third angle is smaller than the first angle and larger than the second angle, the screen management unit 473 may move the screen displayed on the display unit 450 or at least one object included in the screen in a diagonal direction. For example, in some embodiments, the screen management unit 473 may move the screen or at least one object included in the screen in a direction opposite to the movement direction of the thumb.

According to an embodiment, the electronic device 400 include the memory 460, the touchscreen (for example, the display unit 450), the sensor unit 420, and at least one processor (for example, the controller 470) operatively coupled to the memory 460 may display a screen on the touchscreen 450, identify at least one coordinate of a gesture performed on the touchscreen 450, identify a tilt change value of the electronic device 400 by using the sensor unit 420 and controlling the screen based on the coordinate and the tilt change value of the electronic device 400 and displaying the controlled screen.

The processor 470 may identify movement coordinates from a start location to an end location of the gesture. The processor 470 may detect whether a coordinate of the end location is situated in a movable area.

The processor 470 may retrieve from memory 460 a first indication of a first angle and a second indication of a second angle if the end location is situated outside of the movable area, and identify a third angle based on the end location, and controls the screen according to a result of the comparison between the first angle, the second angle, the third angle, and the tilt change value.

The processor 470 may move the screen or at least one object included in the screen in at least one of an upward direction and a downward direction if the third angle is larger than the first angle, move the screen or at least one object included in the screen in at least one of a left direction and a right direction if the third angle is smaller than the second angle, and move the screen or at least one object included in the screen in a diagonal direction if the third angle is larger than the first angle and smaller than the second angle.

The processor 470 may enter a menu for setting the movable area, identify movement coordinates of the gesture on the touchscreen 450, identify the tilt change value of the electronic device when the movement coordinates are identified, set the at least one movable area based on the tilt change value and the movement coordinates.

The processor 470 may set a first movable area having a radius of a distance to the coordinate detected if the tilt change value from one of lower left and right corners of the touch screen is smaller than a threshold, and set a second movable area having a radius of a distance to the coordinate detected if the tilt change value from one of lower left and right corners of the touch screen is larger than the threshold.

The processor 470 may set the movable area having a radius of a distance to the coordinate detected if the tilt change value from one of lower left and right corners of the touch screen is larger than a threshold.

The first angle may be an angle between the lower edge of the touchscreen 450 and a virtual line connecting one of the lower left and right corners of the touchscreen 450 and a particular point of the upper edge. The second angle may be an angle between the lower edge of the touchscreen 450 and a virtual line connecting one of the lower left and right corners of the touchscreen 450 and a particular point of the side edge. The third angle may be an angle generated using a virtual line connecting a start location and an end location and a virtual line running in parallel to the lower edge.

Figure 5:
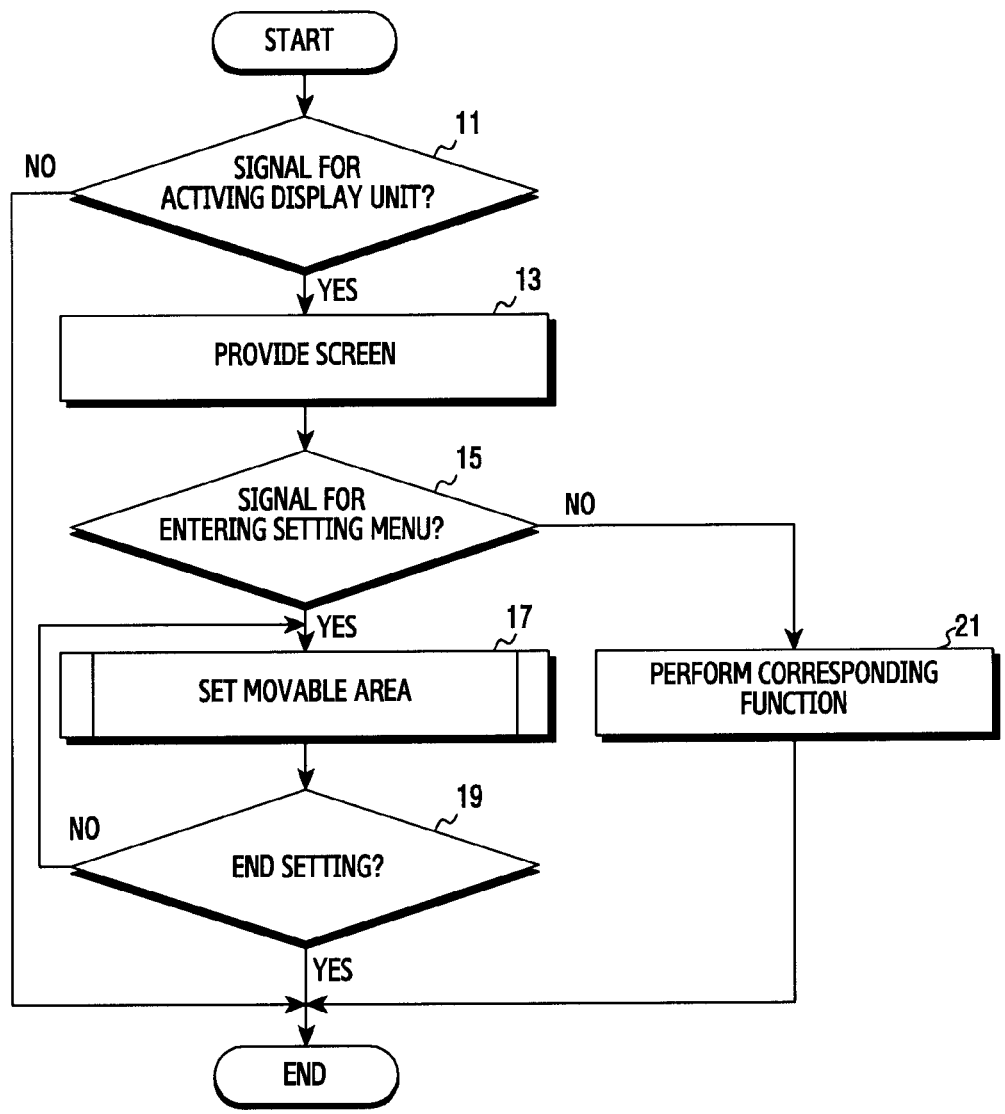
FIG. 5 is a flowchart of an example of a process, according to an embodiment of the present disclosure.

FIG. 5 is a flowchart of an example of a process, according to an embodiment of the present disclosure.

According to the process, the controller 470 may perform operation 13 in response to receiving a signal for activating the display unit 450 through the input unit 440 in operation 11, and end the process when the signal for activating the display unit 450 is not received. For example, the signal for activating the display unit 450 may be generated by an input through a home button or a power button included in the electronic device 400.

In operation 13, the controller 470 may display a screen on the display unit 450. The screen may include an object such as an image (or icon) and/or a screen of an application.

When a signal for entering a setting menu to set a movable area is received in operation 15, the controller 470 may perform operation 17. The entry signal may be a signal generated in response to a user input that is received via the input unit 440 and/or the display unit 450.

In operation 17, the controller 470 may set the movable area according to a user input that is received via the display unit 450 implemented as the touchscreen. An operation for setting the movable area by the controller 470 will be described in more detail with reference to FIGS. 6-9.

Figure 6:
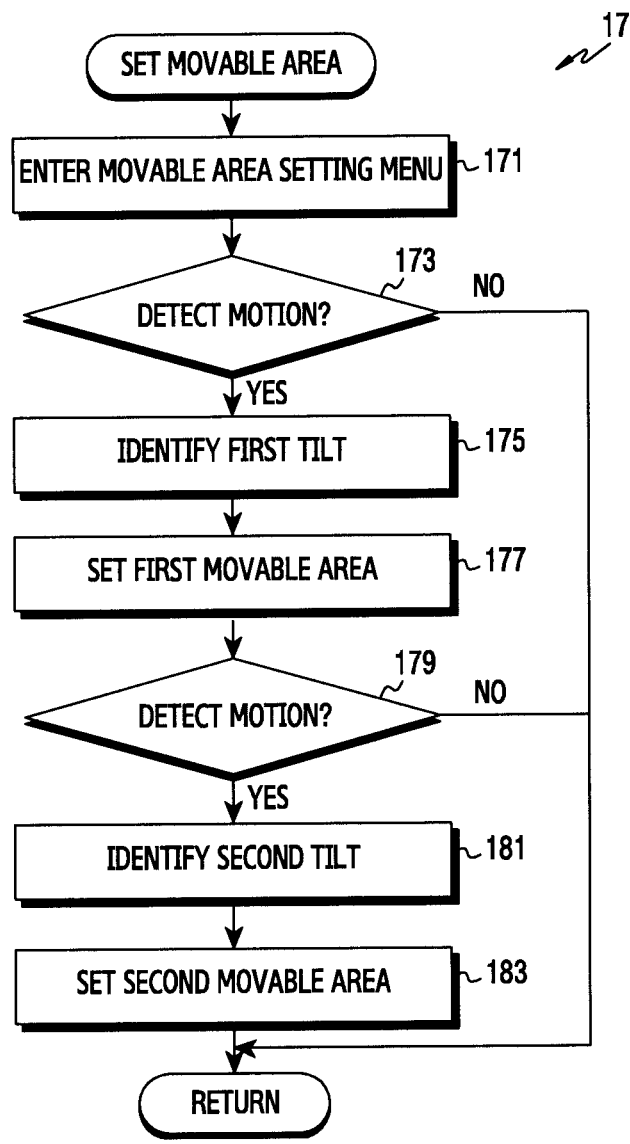
FIG. 6 is a flowchart of an example of a process, according to an embodiment of the present disclosure.

FIG. 6 is a flowchart of an example of a process for performing operation 17, according to an embodiment of the present disclosure. FIGS. 7A-B, 8A-B, and 9 illustrate examples of user interface screens, according to an embodiment of the present disclosure.

Referring to FIGS. 6, 7A, 7B, 8A 8B, and 9, the controller 470 may enter the setting menu for setting the movable area in operation 171. When entering the setting menu for the movable area, the controller 470 may detect a gesture performed on the surface of the display unit 450. The controller 470 may perform operation 175 in response to detecting the gesture in operation 173, and may perform operation 19 of FIG. 5 when no gesture is detected.

Figure 7B:
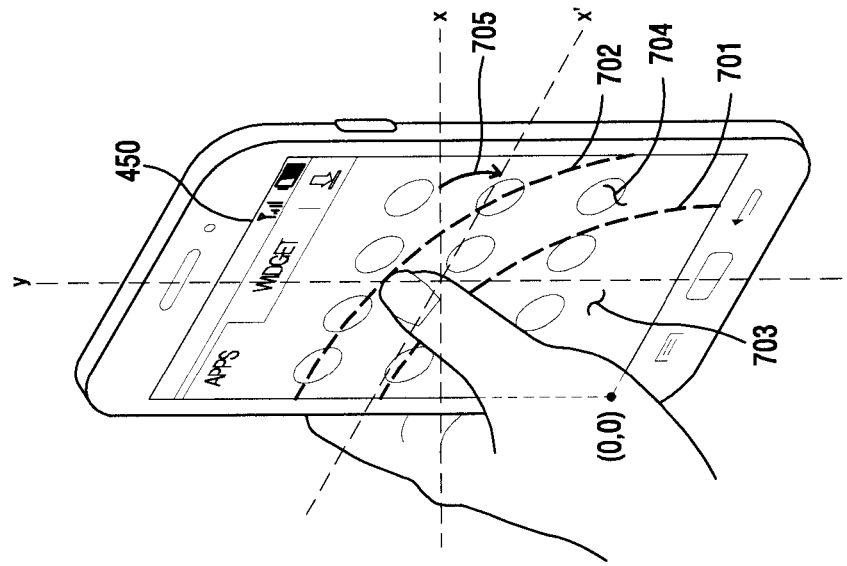
FIG. 7B is a diagram illustrating the operation of the processes of FIGS. 5-6, according to an embodiment of the present disclosure.
Figure 7A:
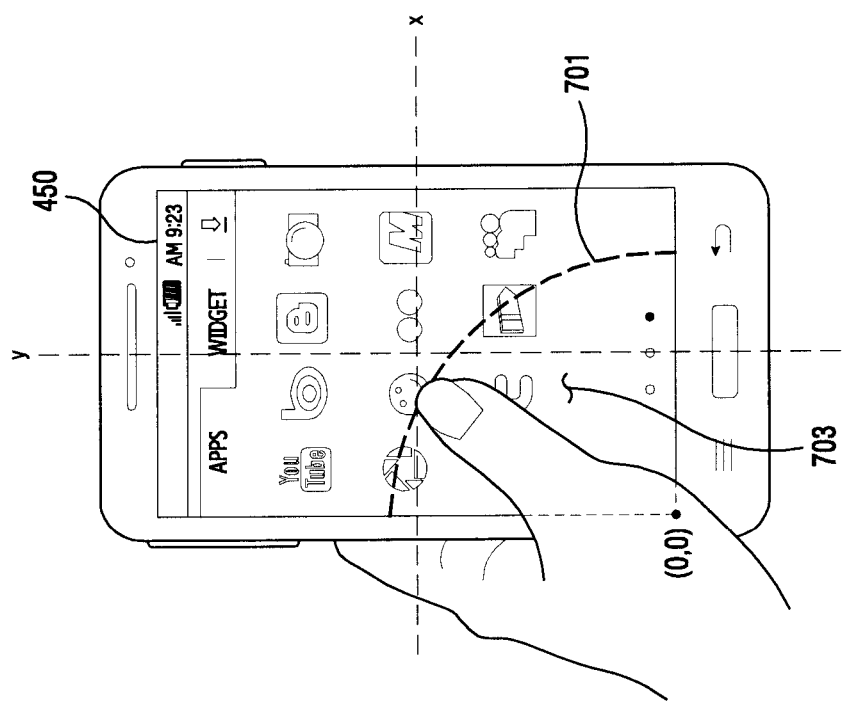
FIG. 7A is a diagram illustrating the operation of the processes of FIGS. 5-6, according to an embodiment of the present disclosure.

The controller 470 may identify a first tilt in operation 175 and set a first movable area in operation 177. For example, the user's gesture corresponding to at least one illustrated in FIGS. 7A-9 may be detected. According to various embodiments of the present disclosure, after entering the setting menu, the user may move a left thumb on the surface of the display unit 450 such that the left thumb defines a trace 701 while maintaining the tilt of the electronic device 400, for example, when there is no change in x and y axes as illustrated in FIG. 7A. As illustrated in FIG. 7A, the controller 470 may set an area of the display unit 450 between the coordinate (0, 0) and a coordinate of the trace 701 detected along with the left thumb as a first movable area 703 when there is no change in the tilt of the electronic device 400.

According to various embodiments of the present disclosure, after entering the setting menu, the user may move a right thumb on the surface of the display unit 450 such that the right thumb defines a trace 801 while maintaining the tilt of the electronic device 400, for example, when there is no change in x and y axes as illustrated in FIG. 8A. The controller 470 may set, as a first movable area 803, an area of the display unit 450 between a coordinate (x, y) and the trace 801 defined by the movement of the right thumb that is performed when there is no change in the tilt of the electronic device 400 as illustrated in FIG. 8A.

Figure 9:
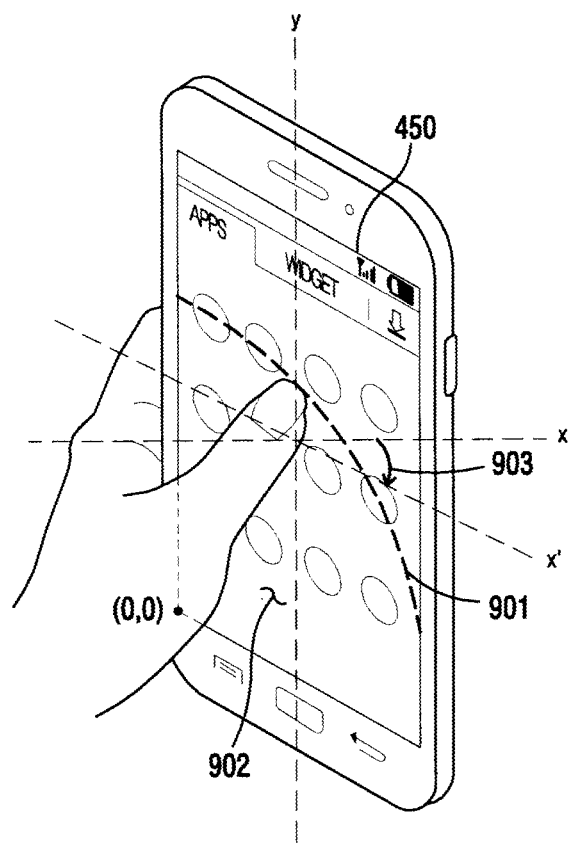
FIG. 9 is a diagram illustrating the operation of the processes of FIGS. 5-6, according to an embodiment of the present disclosure.

According to various embodiments of the present disclosure, after entering the setting menu, the user may move a left thumb on the surface of the display unit 450 such that the left thumb defines a trace 901 which can reach as much as possible while the user changes the tilt of the electronic device 400. For example, the controller 470 may identify a tilt change value 903 of the tilt of the electronic device 400 from an x-axis to an x'-axis in a clockwise direction. The controller 470 may set, as a first movable area 902, an area between the coordinate (0, 0) and the trace 901 detected as a result of the movement of the left thumb when the electronic device 400 has the tilt change value 903 as illustrated in FIG. 9.

In operation 179, the controller 470 may detect whether a user's gesture performed on the surface of the display unit 450. When the user's gesture is not detected in operation 179, the controller 470 may perform operation 19. For example, when the user's gesture is not detected on the surface of the display unit 450 for a threshold time after the first movable area 902 is set as illustrated in FIG. 9, the controller 470 may proceed to operation 19.

When the user's gesture is detected in operation 179, the controller 470 may perform operation 181. The controller 470 may identify a second tilt in operation 181 and set a second movable area in operation 183. For example, the user's gesture corresponding to at least one illustrated in FIGS. 7B and 8B may be detected. For example, the user may move the left thumb on the surface of the display unit 450 such that the left thumb defines a trace 702 which can reach as much as possible while the tilt of the electronic device 400 is changed from the tilt shown in FIG. 7A to the tilt shown in FIG. 7B. The controller 470 may identify a tilt change value 705 indicating the change of the tilt of the electronic device when the electronic device 400 is rotated in a clockwise direction to become aligned with the x'-axis. The controller 470 may set, as a second movable area 704, the area between the first movable area 703 and the trace 702 defined by the movement of the left thumb when the electronic device 400 has the tilt change value 705 as illustrated in FIG. 7B.

The user may move a right thumb on the surface of the display unit 450 such that the right thumb defines a trace 802 which can reach as much as possible while the tilt of the electronic device 400 is changed from the tilt shown in FIG. 8A to the tilt shown in FIG. 8B. The controller 470 may identify a tilt change value 805 of the tilt of the electronic device 400 from an x-axis to an x'-axis in a counterclockwise direction. The controller 470 may set, as a second movable area 804, the area between the first movable area 803 and the trace 802 defined by the movement of the right thumb when the electronic device 400 has the tilt change value 805 as illustrated in FIG. 8B.

In operation 183, the controller 470 may perform operation 19 after setting the second movable areas 704 and 804. When a signal for ending the setting of the movable area is received from the display unit 450 in operation 19, the controller 470 may end the process. When the signal for ending the setting of the movable area is not received, the controller 470 may return to operation 17.

According to an embodiment, the first movable areas 703 and 803 may be areas which the user can reach without tilting the electronic device when the user grasps the electronic device with one hand. Additionally or alternatively, the second movable areas 704 and 804 may be areas which the user can reach by tilting the electronic device when the user grasps the electronic device. Alternatively, the second movable areas 704 and 804 may be the furthest areas which the user can reach when the user grasps the electronic device with one hand.

When the signal for entering the setting menu to set the movable area is not received through the input unit 440 in operation 15, the controller 470 may perform operation 21. The controller 470 may perform a function corresponding to a user input that is detected in operation 21. For example, the controller 470 may display an idle screen on the display unit 450 and execute an application corresponding to the signal input by the user.

Figure 10:
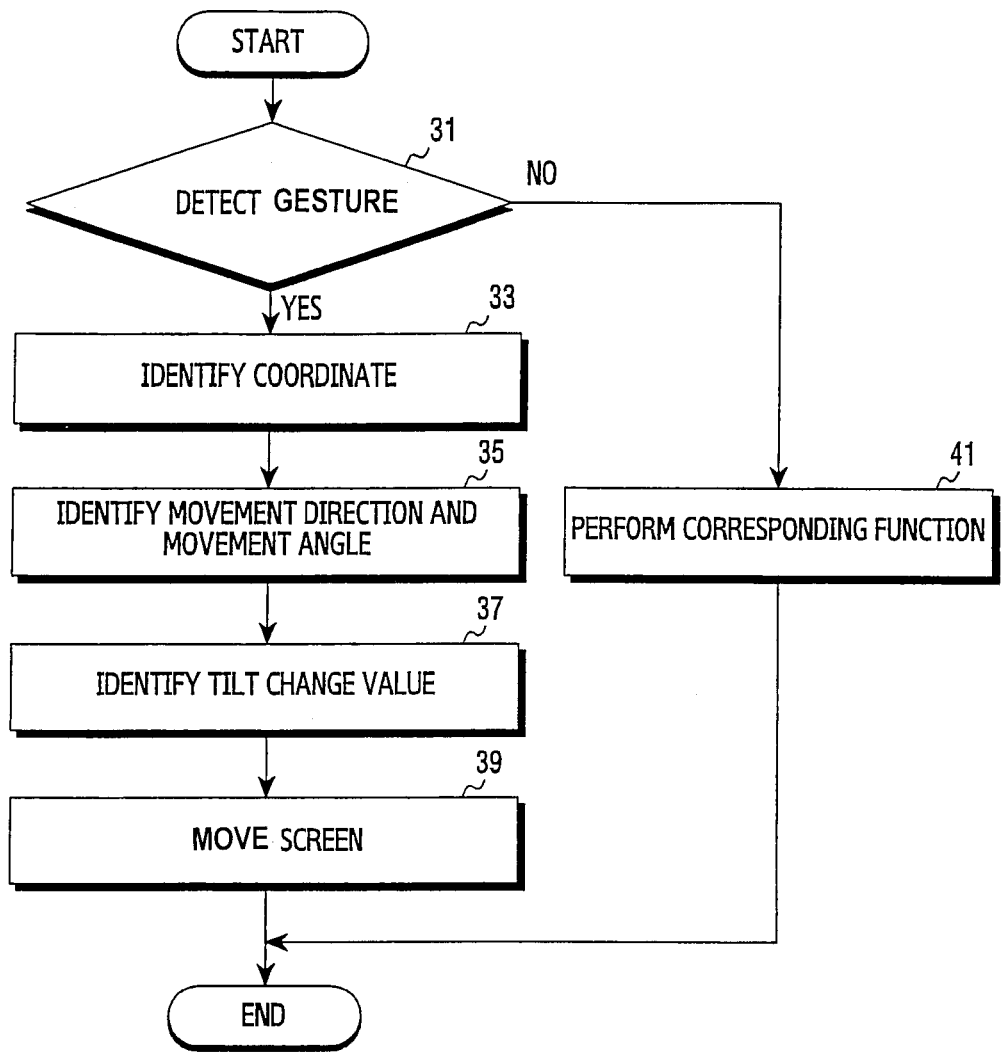
FIG. 10 is a flowchart of an example of a process, according to an embodiment of the present disclosure.
Figure 11:
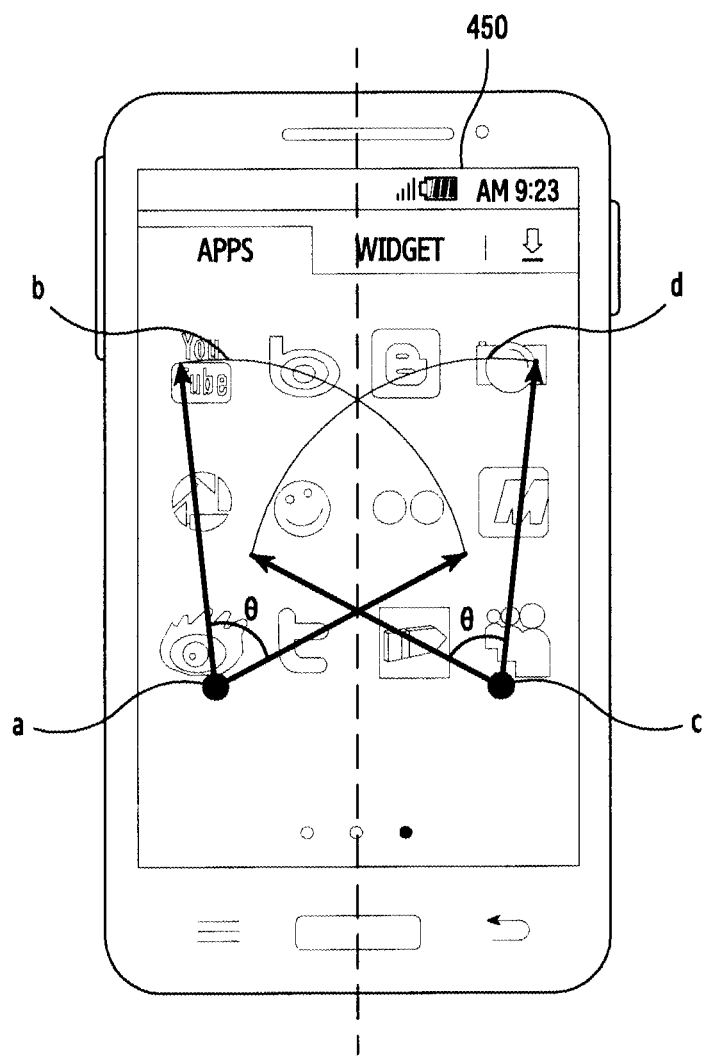
FIG. 11 is a diagram illustrating the operation of the process of FIG. 10, according to an embodiment of the present disclosure.

FIG. 10 is a flowchart of an example of a process, according to an embodiment of the present disclosure. FIG. 11 is a diagram illustrating the operation of the process of FIG. 10, according to an embodiment of the present disclosure.

Referring to FIGS. 10 and 11, the controller 470 may detect whether a gesture is performed on the surface of the display unit 450 in operation 31. The controller 470 may perform operation 33 when the gesture is detected on the surface of the display unit 450 in operation 31, and perform operation 41 when the gesture is not detected. In operation 41, the controller 470 may perform a given function. For example, the controller 470 may display an idle screen on the display unit 450 and/or execute an application corresponding to received user input.

In operation 33, the controller 470 may identify at least one coordinate of the gesture. In operation 35, the controller 470 may identify a movement direction and a movement angle of the user's thumb based on the identified coordinate. For example, when one coordinate is detected, the controller 470 may identify a quadrant in which the detected coordinate is located among different quadrants in the display unit 450. The controller 470 may identify the movement direction and the movement angle of the thumb based on the identified quadrant. When a plurality of coordinates is detected, the controller 470 may identify a start coordinate and an end coordinate based on the plurality of coordinates. The controller 470 may identify the movement direction and the movement angle of the thumb based on the start coordinate and the end coordinate. For example, the coordinate at which the gesture starts be a point where a hovering or touch is initially detected on the surface of the display unit 450. The coordinate at which the gesture ends may be a point where a moving hovering or touch does not move for a threshold time on the surface of the display unit 450.

Referring to FIG. 11, the controller 470 may detect whether the gesture performed on the surface of the display unit 450 is made in a direction from the left a to the right b or from the right c to the left d. According to an embodiment, when the movement direction of the thumb corresponds to the direction from a to b and a movement angle of the thumb is smaller than a particular angle θ stored in the memory 460 as illustrated in FIG. 11, the controller 470 may detect that the user controls the electronic device 400 with the user's left hand. When the movement direction of the thumb corresponds to the direction from c to d and the movement angle of the thumb is smaller than the particular angle θ stored in the memory 460 as illustrated in FIG. 11, the controller 470 may detect that the user controls the electronic device 400 with the user's right hand.

According to an embodiment, the controller 470 may identify a movement direction of the thumb based on coordinates of a start location and an end location of the gesture. The controller 470 may identify an angle between the start location and the end location of the gesture detected on the surface of the display unit 450. The controller 470 may determine the identified angle as a movement angle of the thumb.

In operation 37, the controller 470 may identify a tilt change value of the electronic device 400 and perform operation 39. In operation 39, the controller 470 may move a screen displayed on the display unit 450 based on the movement direction, the movement angle, and the tilt change value. For example, when the user controls the electronic device 400 with the user's left hand, the controller 470 may move the screen displayed on the display unit 450 based on the movement direction, the movement angle, and the tilt change value. When the user controls the electronic device 400 with the user's right hand, the controller 470 may move the screen displayed on the display unit 450 based on the movement direction of the thumb, the movement angle, and the tilt change value. When the one coordinate detected in operation 33 or the end coordinate is located outside the second movable area 704 or 804, the controller 470 may identify that the user controls the electronic device 400 with one of the left and right hands.

Figure 12:
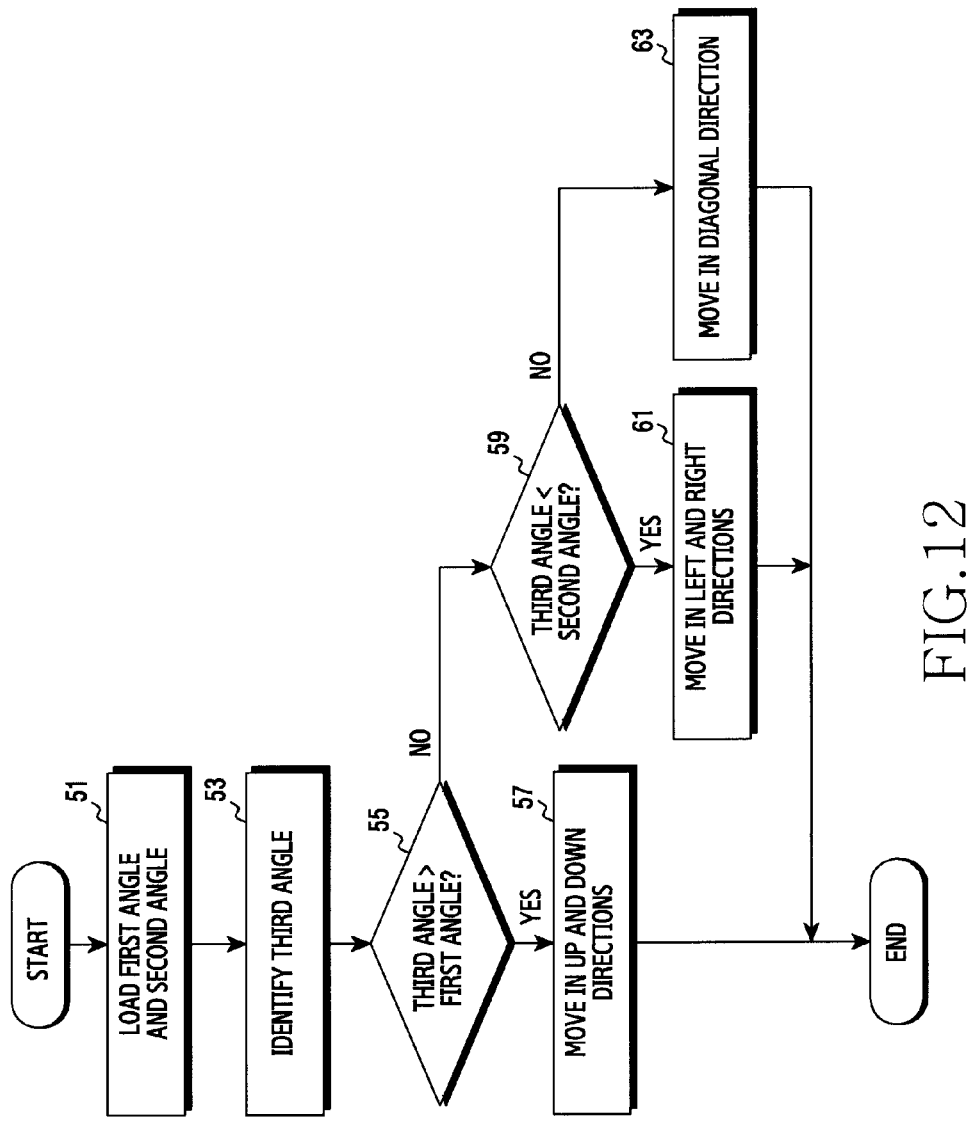
FIG. 12 is a flowchart of an example of a process, according to an embodiment of the present disclosure.
Figure 13:
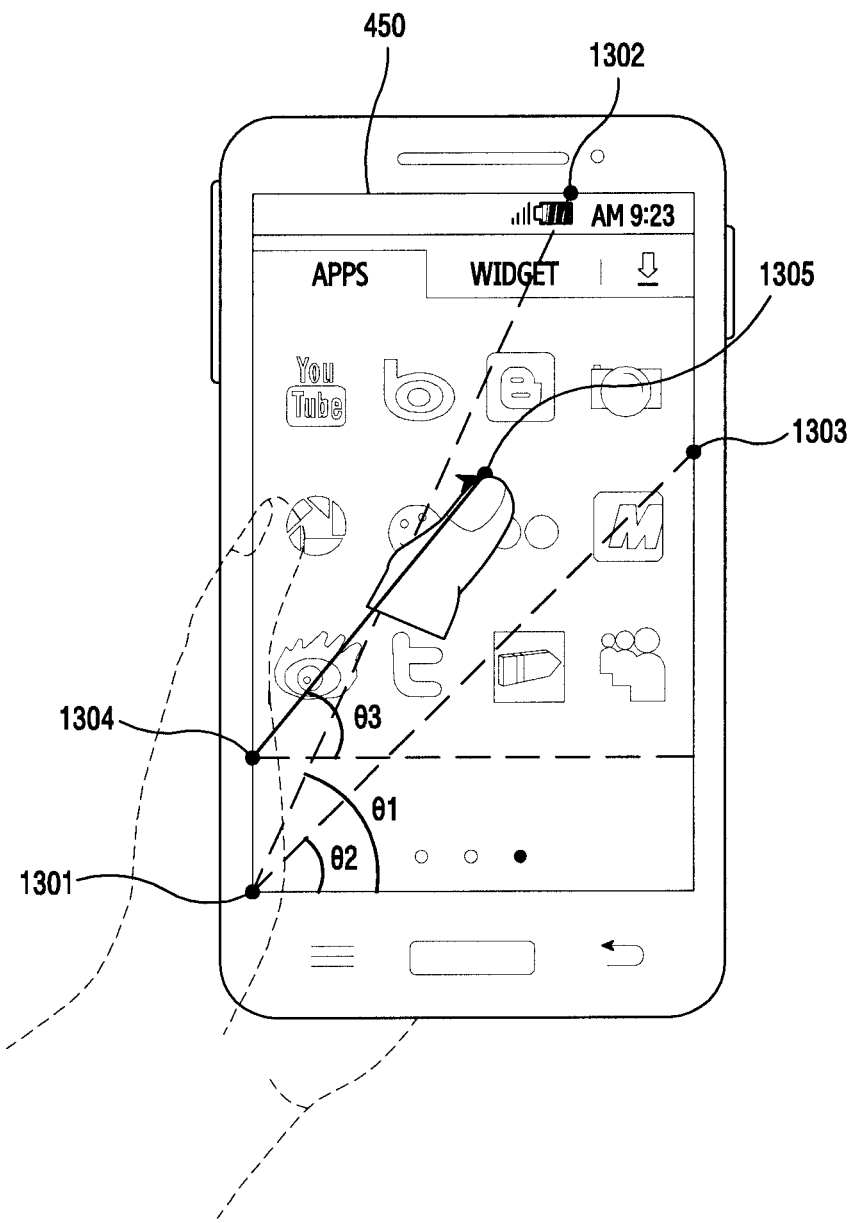
FIG. 13 is a diagram illustrating the operation of the process of FIG. 12, according to an embodiment of the present disclosure.

FIG. 12 is a flowchart of an example of a process, according to an embodiment of the present disclosure. FIG. 13 is a diagram illustrating the operation of the process of FIG. 12, according to an embodiment of the present disclosure.

Referring to FIGS. 12 and 13, the controller 470 may load from memory indication(s) of a first angle and a second angle, stored in the memory 460 in operation 51. In operation 53, the controller 470 may identify a third angle. Referring to FIG. 13, the first angle θ1 may be an angle between a lower edge of the display unit 450 and a virtual line connecting a lower left corner 1301 of the display unit 450 and a predetermined point 1302 of an upper edge of the display unit 450. The second angle θ2 may be an angle between the lower edge of the display unit 450 and a virtual line connecting the lower left corner 1301 of the display unit 450 and a predetermined point 1303 of a right side edge of the display unit 450.

The controller 470 may identify a particular point 1304 in an area of the screen of the electronic device 400 which is gripped by the user. For example, the controller 470 may select, as the particular point 1304, a point located at the center of the area which comes in contact with the user's palm (e.g., physical or electrical contact) when the user grips the electronic device 400. The controller 470 may select the extracted particular point 1304 as a start point. The controller 470 may identify a point 1305 where the movement of the user's finger ends. The controller 470 may identify, as a third angle θ3, an angle between a virtual line running in parallel to the lower edge from the start point 1304 and a virtual line connecting the start point 1304 and an end point 1305. Further, the controller 470 may identify the coordinate (0, 0) of the display unit 450 as the start point. The controller 470 may identify, as the third angle θ3, an angle between the lower edge of the display unit 450 and a virtual line the start point 1301 and the end point 1305.

When the third angle is larger than the first angle in operation 55, the controller 470 may perform operation 57. In operation 57, the controller 470 may move the screen displayed on the display unit 450 or at least one object in up and down directions.

When the third angle is not larger than the first angle in operation 55, the controller 470 may perform operation 59.

When the third angle is larger than the second angle in operation 59, the controller 470 may perform operation 61. In operation 61, the controller 470 may move the screen displayed on the display unit 450 or at least one object in the left and/or right direction.

When the third angle is not larger than the second angle in operation 59, the controller 470 may perform operation 63. In operation 63, the controller 470 may move the screen displayed on the display unit 450 or at least one object in a diagonal direction. In operations 57, 61, and 63, the controller 470 may move the screen or at least one object based on the movement direction, the movement angle, and the tilt change value of the finger identified in FIG. 10.

An operation in which the controller 470 changes the screen displayed on the display unit 450 or at least one object will be described in more detail with reference to FIGS. 14A-16D.

FIGS. 14A-D illustrates an example of a user interface, according to an embodiment of the present disclosure. FIG. 14A illustrates a screen of the electronic device 400 when the user grips the electronic device 400 with the user's left hand while the screen is displayed on the display unit 450.

In the example of FIG. 14A, the controller 470 may identify a coordinate of a start location of a gesture performed by a user's thumb on the surface of the display unit 450. For example, the start location may be a point at the center of an area that makes contact with the user's palm (e.g., electrical or physical) when the user grips the electronic device 400.

The controller 470 may identify that the coordinate of the start location is included in the first movable area set in FIGS. 7A, 8A, and 9. The controller 470 may identify a coordinate of an end location of the gesture. When the coordinate of the end location of the gesture is included in an area except for the first movable area 703 and the second movable area 704 set in FIG. 7B or included in an area except for the first movable area 902 set in FIG. 9, the controller 470 may identify a movement direction of the thumb. For example, the controller 470 may detect whether the coordinate of the end location of the gesture escapes from the trace 702 of FIG. 7B or 901 of FIG. 9 of the left thumb which can reach as much as possible. When the coordinate of the end location of the gesture escapes from the trace 702 of FIG. 7B or 901 of FIG. 9 of the left thumb which can reach as much as possible as illustrated in FIGS. 14B to 14D, the controller 470 may identify a tilt change value by detecting a tilt of the electronic device 400 at the start location and a tilt of the electronic device 400 at the end location.

The controller 470 may identify the third angle by using the coordinate of the start location identified in FIG. 14A and the coordinate of the end location identified in FIG. 14B. When the identified tilt change value corresponds to a change value on the y-axis as illustrated in FIGS. 7A-9 and the identified third angle is larger than the first angle, the controller 470 may determine that the user intends to perform an input into an upper part of the display unit 450. The controller 470 may move downwards the screen displayed on the display unit 450 as illustrated in FIG. 14B.

The controller 470 may identify the third angle by using the coordinate of the start location identified in FIG. 14A and the coordinate of the end location identified in FIG. 14C. When the identified tilt change value corresponds to a change value on the x-axis and the y-axis as illustrated in FIGS. 7A-9 and the identified third angle is smaller than the first angle and larger than the second angle, the controller 470 may determine that the user intends to perform an input into an upper right part of the display unit 450. The controller 470 may diagonally move the screen displayed on the display unit 450 to a lower part of the display unit 450 as illustrated in FIG. 14C.

The controller 470 may identify the third angle by using the coordinate of the start location identified in FIG. 14A and the coordinate of the end location identified in FIG. 14D. When the identified tilt change value corresponds to a change value on the x-axis as illustrated in FIGS. 7A-9 and the identified third angle is smaller than the second angle, the controller 470 may determine that the user intends to make an input into a right part of the display unit 450. In response, the controller 470 may move the screen displayed on the display unit 450 to a left part of the display unit 450 as illustrated in FIG. 14D.

When moving the screen, the controller 470 may move the screen displayed on the display unit 450 based on the identified movement direction of the thumb. When moving the screen, the controller 470 may set a movement range of the screen based on the identified tilt change value. For example, as the tilt change value of the electronic device 400 is larger, the controller 470 may set a larger movement range of the screen.

Figures 15A, 15B, 15C, 15D:
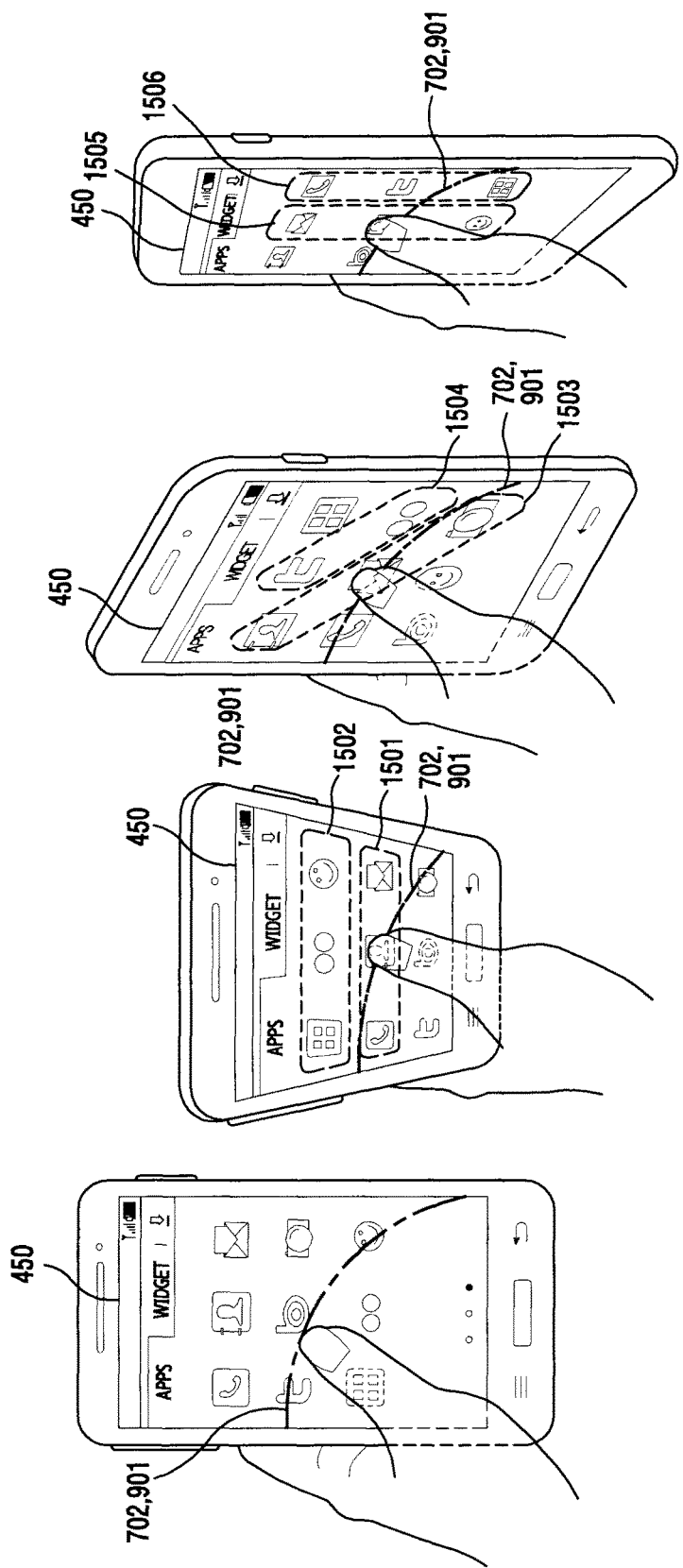
FIG. 15A is a diagram illustrating an example of a user interface, according to an embodiment of the present disclosure.
FIG. 15B is a diagram illustrating an example of a user interface, according to an embodiment of the present disclosure.
FIG. 15C is a diagram illustrating an example of a user interface, according to an embodiment of the present disclosure.
FIG. 15D is a diagram illustrating an example of a user interface, according to an embodiment of the present disclosure.

FIGS. 15A-D illustrate an example of a user interface, according to an embodiment of the present disclosure. FIG. 15A illustrates an example in which the user grips the electronic device 400 with the user's left hand while an idle screen is displayed on the display unit 450.

In the example of FIG. 15A, the controller 470 may identify a coordinate of a start location of a gesture performed by a user's thumb on the surface of the display unit 450. The controller 470 may identify that the coordinate of the start location is included in the first movable area shown in FIGS. 7A, 8A, and 9. The controller 470 may identify a coordinate of an end location of the gesture. When the coordinate of the end location of the gesture is located outside the first movable area 703 and the second movable area 704 shown in FIG. 7B or located outside of the first movable area 902 shown in FIG. 9, the controller 470 may identify a movement direction of the thumb (e.g., a direction in which the thumb moves). For example, the controller 470 may detect whether the coordinate of the end location of the gesture escapes from the trace 702 shown in FIG. 7B or 901 shown in FIG. 9 of the left thumb which can reach as much as possible. When the coordinate of the end location of the gesture escapes from the trace 702 of FIG. 7B or 901 of FIG. 9 which corresponds to the maximum reach of the user's thumb, as illustrated in FIGS. 15B-D, the controller 470 may identify a tilt change value by detecting a tilt of the electronic device 400 at the start location and a tilt of the electronic device 400 at the end location.

The controller 470 may identify the third angle by using the coordinate of the start location identified in FIG. 15A and the coordinate of the end location identified in FIG. 15B. When the identified tilt change value corresponds to a change value on the y-axis as illustrated in FIGS. 7A-9 and the identified third angle is larger than the first angle, the controller 470 may determine that the user intends to make an input on an upper part of the display unit 450. The controller 470 may change an arrangement of objects displayed on the display unit 450 as illustrated in FIG. 15B. For example, the controller 470 may move a horizontal column 1501 including an object positioned at an end location to a location similar or proximate to the end location. Further, the controller 470 may move objects 1502 positioned in another column as much as the horizontal column has moved (e.g., by the same distance as the distance by which the horizontal column has moved and/or by a distance that is determined based on the distance by which the horizontal column has moved).

The controller 470 may identify the third angle by using the coordinate of the start location identified in FIG. 15A and the coordinate of the end location identified in FIG. 15C. When the identified tilt change value corresponds to a change value on the x-axis and the y-axis as illustrated in FIGS. 7A-9 and the identified third angle is smaller than the first angle and larger than the second angle, the controller 470 may determine that the user intends to make an input into an upper right part of the display unit 450. The controller 470 may change the arrangement of the objects displayed on the display unit 450 as illustrated in FIG. 15C. For example, the controller 470 may move a diagonal column 1503 including an object positioned at an end location to a location similar or proximate to the end location. Further, the controller 470 may move objects 1504 positioned in another column as much as the column has moved.

The controller 470 may identify the third angle by using the coordinate of the start location identified in FIG. 15A and the coordinate of the end location identified in FIG. 15D. When the identified tilt change value corresponds to a change value on the x-axis as illustrated in FIGS. 7A-9 and the identified third angle is smaller than the second angle, the controller 470 may determine that the user intends to make an input into a right part of the display unit 450. The controller 470 may change the arrangement of the objects displayed on the display unit 450 as illustrated in FIG. 15D. For example, the controller 470 may move a vertical column 1505 including an object positioned at an end location to a location similar or proximate to the end location. Further, the controller 470 may move objects 1506 positioned in another vertical column as much as the vertical column has moved.

FIGS. 16A-C illustrate an example of a user interface, according to an embodiment of the present disclosure. FIG. 16A illustrates an example in which the user grips the electronic device 400 with the user's left hand while a screen related to a web browser 1600 is displayed on the display unit 450.

In the example of FIG. 16A, the controller 470 may identify a coordinate of a start location of a gesture performed by a user's thumb on the surface of the display unit 450. The controller 470 may detect that the coordinate of the start location is included in the first movable area shown in FIGS. 7A, 8A, and 9. The controller 470 may identify a coordinate of an end location of the gesture. When the coordinate of the end location of the gesture is included in an area except for the first movable area 703 and the second movable area 704 shown in FIG. 7B or included in an area except for the first movable area 902 shown in FIG. 9, the controller 470 may identify a movement direction of the thumb. For example, the controller 470 may detect whether the coordinate of the end location of the gesture escapes from the trace 702 of FIG. 7B or 901 of FIG. 9 which corresponds to the user's left thumb's maximum reach. When the coordinate of the end location of the gesture escapes from the trace 702 of FIG. 7B or 901 of FIG. 9 of the left thumb which can reach as much as possible as illustrated in FIG. 16B, the controller 470 may identify a tilt change value by checking a tilt of the electronic device 400 at the start location and a tilt of the electronic device 400 at the end location.

The controller 470 may identify the third angle by using the coordinate of the start location identified in FIG. 16A and the coordinate of the end location identified in FIG. 16A.

When the identified tilt change value corresponds to a change value on the y-axis as illustrated in FIGS. 7A-9 and the identified third angle is larger than the first angle, the controller 470 may determine that the user intends to make an input into an upper right part of the display unit 450. The controller 470 may move the web browser 1600 displayed on the display unit 450 to a lower part of the display unit 450 as illustrated in FIG. 16B. When the output web browser 1600 of FIG. 16A is moved to the lower part, another existing open web browser 1601 may be displayed as illustrated in FIG. 16B.

When the user selects an address bar of the web browser 1600 in the screen shown in FIG. 16B, the controller 470 may return the location of the web browser 1600 to the state of FIG. 16A and display the web browser 1600 as illustrated in FIG. 16C. The controller 470 may output a virtual keyboard 1603 for inputting an address into the address bar 1602 into a low part of the display unit 450 simultaneously with changing a display location of the web browser 1600.

According to various embodiment, a method of providing a user interface may include an operation of displaying a screen on a touchscreen (for example, the display unit 450), an operation of identifying at least one coordinate of a gesture performed on the touchscreen 450, an operation of identifying a tilt change value of the electronic device 400, and an operation of controlling the screen based on the coordinate and the tilt change value of the electronic device 400 and displaying the controlled screen.

The operation of identifying the at least one coordinate may be an operation of identifying movement coordinates from a start location to an end location of the gesture, The operation may further include an operation of detecting whether a coordinate of the end location is situated in a movable area.

The operation of controlling the screen based on the coordinate and the tilt change value of the electronic device 400 and the displaying of the controlled screen may be an operation of, retrieving from a memory 460 of the electronic device 400 an indication of a first angle between a lower edge of the touchscreen 450 and a first line connecting one of lower left and lower right corners of the touchscreen 450 and a first point on an upper edge of the touchscreen 450 if the end location is located outside of the movable area, retrieving from the memory 460 of the electronic device 400 an indication of a second angle between the lower edge of the touchscreen 450 and a second line connecting one of the lower left and lower right corners of the touchscreen 450 and a second point of a side edge of the touchscreen 450, identifying a third angle based on a third line connecting the start location and the end location and a fourth line starting at the start location and running in parallel to the lower edge of the touchscreen 450, controlling the screen according to a result of the comparison between the first angle, the second angle, and the third angle, and the tilt change value, and displaying the controlled screen.

The operation of controlling the screen may be an operation of moving the screen or at least one object included in the screen in at least one of an upward direction and a downward direction and displaying the moved screen or object if the third angle is larger than the first angle.

The operation of controlling the screen may be an operation of moving the screen or at least one object included in the screen in at least one of a left direction and a right direction and displaying the moved screen or object if the third angle is smaller than the second angle.

The operation of controlling the screen may be an operation of moving the screen or at least one object included in the screen in a diagonal direction and displaying the moved screen or object if the third angle is larger than the first angle and smaller than the second angle.

The operation of displaying of the screen on the touchscreen 450 may further include an operation of displaying the screen on the touchscreen 450 in response to a signal for activating the touchscreen 450, and an operation of setting the movable area in response to a signal for setting the movable area.

The operation of setting the movable area may include an operation of entering a menu for setting the movable area, an operation of identifying movement coordinates of the gesture on the touchscreen 450; an operation of identifying the tilt change value of the electronic device 400 when the movement coordinates are identified; and an operation of setting at least one movable area based on the tilt change value and the movement coordinates.

The operation of setting at least one movable area may include an operation of setting a first movable area having a radius of a distance to the coordinate detected if the tilt change value from one of lower left and right corners of the touchscreen 450 is smaller than a threshold; and an operation of setting a second movable area having a radius of a distance to the coordinate detected if the tilt change value from one of lower left and right corners of the touchscreen 450 is larger than the threshold.

The operation of setting of at least one movable area may include an operation of setting the movable area comprises setting the movable area having a radius of a distance to the coordinate detected if the tilt change value from one of lower left and right corners of the touchscreen 450 is larger than a threshold.

According to an embodiment, a method of providing a user interface may include an operation of displaying a screen on the touchscreen 450 in response to a signal for activating the touchscreen 450 included in the electronic device 400, an operation of identifying a movement coordinate of a gesture performed on the touchscreen 450, an operation of identifying a tilt change value of the electronic device 400 when identifying the movement coordinate, an operation of connecting movement coordinates of the gesture and displaying the connected movement coordinates on the touchscreen 450, and an operation of setting at least one movable area based on the movement coordinates and the tilt change value.

FIGS. 1-16C are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method in an electronic device comprising:
   displaying a screen on a touchscreen;
   identifying at least one coordinate of a gesture performed on the touchscreen;
   identifying a tilt change value of the electronic device; and
   controlling the screen based on the coordinate of the gesture and the tilt change value of the electronic device and displaying the controlled screen,
   wherein the controlling of the screen comprises:
   detecting a third angle based on the coordinate of the gesture,
   comparing the third angle with a first angle and a second angle, wherein the first angle is larger than the second angle,
   if the third angle is larger than the first angle, moving the screen or at least one object included in the screen in a first direction,
   if the third angle is smaller than the second angle, moving the screen or at least one object included in the screen in a second direction, and
   if the third angle is larger than the second angle and smaller than the first angle, moving the screen or at least one object included in the screen in a third direction.

2. The method of claim 1, wherein identifying the at least one coordinate comprises identifying movement coordinates from a start location to an end location of the gesture.

3. The method of claim 2, further comprising detecting whether a coordinate of the end location is situated in a movable area.

4. The method of claim 3, wherein the controlling of the screen based on the coordinate and the tilt change value of the electronic device and the displaying of the controlled screen comprises:
   retrieving from a memory of the electronic device an indication of the first angle between a lower edge of the touchscreen and a first line connecting one of lower left and lower right corners of the touchscreen and a first point on an upper edge of the touchscreen if the end location is located outside of the movable area;
   retrieving from the memory of the electronic device an indication of the second angle between the lower edge of the touchscreen and a second line connecting one of the lower left and lower right corners of the touchscreen and a second point of a side edge of the touchscreen;
   identifying the third angle based on a third line connecting the start location and the end location and a fourth line starting at the start location and running in parallel to the lower edge of the touchscreen,
   controlling the screen according to a result of the comparison between the first angle, the second angle, and the third angle, and the tilt change value, and displaying the controlled screen.

5. The method of claim 4, wherein the controlling of the screen comprises, moving the screen or at least one object included in the screen in at least one of an upward direction and a downward direction and displaying the moved screen or object if the third angle is larger than the first angle.

6. The method of claim 4, wherein the controlling of the screen comprises, moving the screen or at least one object included in the screen in at least one of a left direction and a right direction and displaying the moved screen or object if the third angle is smaller than the second angle.

7. The method of claim 4, wherein the controlling of the screen comprises, moving the screen or at least one object included in the screen in a diagonal direction and displaying the moved screen or object if the third angle is larger than the second angle and smaller than the first angle.

8. The method of claim 3, wherein the displaying the screen on the touchscreen further comprising:
   displaying the screen on the touchscreen in response to a signal for activating the touchscreen; and
   setting the movable area in response to a signal for setting the movable area.

9. The method of claim 8, wherein the setting of the movable area comprises:
   entering a menu for setting the movable area;
   identifying movement coordinates of the gesture on the touchscreen;
   identifying the tilt change value of the electronic device when the movement coordinates are identified; and
   setting at least one movable area based on the tilt change value and the movement coordinates.

10. The method of claim 9, wherein the setting of said at least one movable area comprises:
    setting a first movable area having a radius of a distance to the coordinate detected if the tilt change value from one of lower left and right corners of the touch screen is smaller than a threshold; and
    setting a second movable area having a radius of a distance to the coordinate detected if the tilt change value from one of lower left and right corners of the touch screen is larger than the threshold.

11. The method of claim 9, wherein the setting of said at least one movable area comprises setting the movable area having a radius of a distance to the coordinate detected if the tilt change value from one of lower left and right corners of the touch screen is larger than a threshold.

12. An electronic device for providing a user interface, the electronic device comprising:
    a memory;
    a touchscreen;
    a sensor unit; and
    at least one processor operatively coupled to the memory, configured to:
    display a screen on the touchscreen;

identify at least one coordinate of a gesture performed on the touchscreen;
identify a tilt change value of the electronic device by using the sensor unit; and
control the screen based on the coordinate of the gesture and the tilt change value of the electronic device and displaying the controlled screen,
wherein the processor is configured to:
detect a third angle based on the coordinate of the gesture,
comparing the third angle with a first angle and a second angle, wherein the first angle is larger than the second angle,
if the third angle is larger than the first angle, move the screen or at least one object included in the screen in a first direction,
if the third angle is smaller than the second angle, move the screen or at least one object included in the screen in a second direction, and
if the third angle is larger than the second angle and smaller than the first angle, move the screen or at least one object included in the screen in a third direction.

13. The electronic device of claim 12, wherein the processor is configured to identify movement coordinates from a start location to an end location of the gesture.

14. The electronic device of claim 13, wherein the processor is configured to detect whether a coordinate of the end location is situated in a movable area.

15. The electronic device of claim 14, wherein the processor is configured to: retrieve from memory a first indication of the first angle and a second indication of the second angle if the end location is situated outside of the movable area, and identify the third angle based on the end location, and controls the screen according to a result of the comparison between the first angle, the second angle, the third angle, and the tilt change value.

16. The electronic device of claim 15, wherein the processor is configured to:
move the screen or at least one object included in the screen in at least one of an upward direction and a downward direction if the third angle is larger than the first angle;
move the screen or at least one object included in the screen in at least one of a left direction and a right direction if the third angle is smaller than the second angle; and
move the screen or at least one object included in the screen in a diagonal direction if the third angle is larger than the second angle and smaller than the first angle.

17. The electronic device of claim 14, wherein the processor is configured to:
enter a menu for setting the movable area,
identify movement coordinates of the gesture on the touchscreen,
identify the tilt change value of the electronic device when the movement coordinates are identified,
set the at least one movable area based on the tilt change value and the movement coordinates.

18. The electronic device of claim 17, wherein the processor is configured to:
set a first movable area having a radius of a distance to the coordinate detected if the tilt change value from one of lower left and right corners of the touch screen is smaller than a threshold; and
set a second movable area having a radius of a distance to the coordinate detected if the tilt change value from one of lower left and right corners of the touch screen is larger than the threshold.

19. The electronic device of claim 17, wherein the processor is configured to:
set the movable area having a radius of a distance to the coordinate detected if the tilt change value from one of lower left and right corners of the touch screen is larger than a threshold.

20. The electronic device of claim 16, wherein:
the first angle is between a lower edge of the touchscreen and a first line connecting one of lower left and lower right corners of the touchscreen and a first point on an upper edge of the touchscreen if the end location is located outside of the movable area,
the second angle is between the lower edge of the touchscreen and a second line connecting one of the lower left and lower right corners of the touchscreen and a second point of a side edge of the touchscreen, and
the third angle is based on a third line connecting the start location and the end location and a fourth line starting at the start location and running in parallel to the lower edge of the touchscreen.

* * * * *